United States Patent
Schiff et al.

[11] Patent Number: 5,636,899
[45] Date of Patent: Jun. 10, 1997

[54] KINEMATIC STRUCTURE FOR VEHICLE ARMREST

[75] Inventors: Jon D. Schiff, St. Joseph, Mich.; Daniel R. Vander Sluis, West Lafayette, Ind.

[73] Assignee: Atlantic Automotive Components, Inc., Benton Harbor, Mich.

[21] Appl. No.: 568,789

[22] Filed: Dec. 7, 1995

[51] Int. Cl.$^6$ ............................................. B60N 2/46
[52] U.S. Cl. ..................... 297/411.36; 297/344.19; 248/118; 248/631
[58] Field of Search .................. 297/411.36, 344.19; 248/118, 631, 421

[56] References Cited

U.S. PATENT DOCUMENTS

| | | | |
|---|---|---|---|
| 3,558,094 | 1/1971 | Radke et al. | 248/631 X |
| 3,853,372 | 12/1974 | Meyer | 297/411.36 X |
| 4,186,456 | 2/1980 | Huempfner | 297/411.36 X |
| 4,573,657 | 3/1986 | Sakamoto | 248/421 X |
| 4,872,727 | 10/1989 | Rye | 297/411.36 |
| 4,979,773 | 12/1990 | Eubank | 248/421 X |
| 5,542,638 | 8/1996 | Smith | 248/421 |

*Primary Examiner*—Peter M. Cuomo
*Assistant Examiner*—Stephen Vu
*Attorney, Agent, or Firm*—Brooks & Kushman P.C.

[57] ABSTRACT

An armrest assembly is provided for a vehicle. A base is mounted to the vehicle and includes a translational member slidably mounted for vertical movement with respect to the base. An armrest is coupled to the translational member. A loadable actuator having first and second ends is coupled at its first end to the armrest. A first support member having first and second ends is pivotally connected at its first end with respect to the base. A second support member having first and second ends is pivotally connected at its first end to the second end of the first support member, and pivotally connected at its second end with respect to the translational member. The second end of the loadable actuator is pivotally coupled with respect to the first support member intermediate the first and second ends of the first support member, whereby to provide a moment arm to facilitate loading of the actuator as the armrest is lowered. A kinematic structure is also provided for use with an air spring assembly.

15 Claims, 4 Drawing Sheets

KINEMATIC STRUCTURE FOR VEHICLE ARMREST

TECHNICAL FIELD

This invention relates to armrests for vehicles, and more particularly to a kinematic structure adapted for use with an adjustable height armrest in a vehicle.

BACKGROUND ART

Vehicle armrests are comfort features which appeal to many purchasers of vehicles. Given the vast range of anthropometric parameters which must be accommodated by a vehicle passenger compartment, it is desirable to have features which are adjustable to satisfy customers of different sizes. Accordingly, adjustable steering wheels, seats, mirrors, etc., have been developed to satisfy the needs of customers of various sizes. Additionally, various attempts have been made to provide adjustable vehicle armrests to accommodate such varying customer demands.

A major problem with prior art adjustable armrest designs is cost and complexity of manufacture. Generally, prior art adjustable armrests comprise complicated designs or require the use of expensive electric motors to actuate adjustment of the armrests. Some sample adjustable armrests are disclosed in U.S. Pat. Nos. 4,244,623; 4,619,478; 4,674,790 and 4,984,847. These designs are generally complex or expensive to manufacture. The '478 and '847 patents include expensive electric motors for actuation. The '623 and '790 patents require the user to physically adjust the armrest by hand without assistance of the assembly. This manual adjustment can be cumbersome due to the substantial weight and size of the armrest assembly.

To overcome the disadvantages experienced in prior art designs, it is desirable to develop an adjustable height armrest which is self-actuated and does not require an expensive motor or a complex linkage arrangement. It is further desirable to develop an adjustable height armrest in which the armrest itself is pivotable to an upright vertical position in order to allow access to storage areas beneath the armrest.

SUMMARY OF THE INVENTION

Accordingly, it is an object of the present invention to provide a vehicle armrest assembly which avoids the above-referenced problems.

The present invention overcomes the disadvantages of prior art armrest assemblies by providing a self-actuating adjustable armrest assembly which is inexpensive to manufacture and does not require the use of electric motors for actuation. The present invention further provides an armrest assembly in which the armrest itself is pivotable to an upright vertical position which provides access to storage compartments beneath the armrest.

A preferred embodiment of the present invention provides an armrest assembly for a vehicle, comprising: a base adapted for mounting in the vehicle; a translational member slidably mounted for vertical movement with respect to the base; an armrest coupled to the translational member for movement therewith; a loadable actuator having first and second ends, the first end of the actuator being operatively coupled to the armrest for moving the armrest when loaded; a first support member having first and second ends, the first end of the first support member being pivotally coupled with respect to the base; a second support member having first and second ends, the first end of the second support member being pivotally coupled to the second end of the first support member, and the second end of the second support member being pivotally coupled with respect to the translational member; and the second end of the loadable actuator being pivotally coupled with respect to the first support member intermediate the first and second ends of the first support member whereby to provide a moment arm to facilitate loading of the actuator as the armrest is moved downwardly.

Another aspect of the present invention provides an armrest assembly for a vehicle, comprising: a base; an armrest slidably connected with respect to the base; a loadable actuator having first and second ends, the first end of the actuator being operatively coupled to the armrest for moving the armrest when loaded; a moment arm member pivotally connected to the base and operatively coupled to the second end of the loadable actuator to provide mechanical advantage to facilitate movement of the armrest against resistance of the actuator.

A further embodiment of the present invention provides a kinematic structure for an air spring assembly, comprising: a base; a translational member slidably mounted with respect to the base; a movable member coupled to the translational member for movement therewith; a loadable air spring having first and second ends, the first end of the air spring being operatively coupled to the movable member for movement therewith; a first support member having first and second ends, the first end of the first support member being pivotally coupled with respect to the base; a second support member having first and second ends, the first end of the second support member being pivotally coupled to the second end of the first support member, and the second end of the second support member bering pivotally coupled with respect to the translational member; and the second end of the air spring being pivotally coupled with respect to the first support member intermediate the first and second ends of the first support member whereby to provide a moment arm to facilitate loading of the air spring as the movable member is moved in a direction to load the air spring.

The above objects and other objects, features and advantages of the present invention are readily apparent from the following detailed description of the best mode for carrying out the invention when taken in conjunction with the accompanying drawings.

DETAILED DESCRIPTION OF THE PREFERRED EMBODIMENTS

Figure 1:
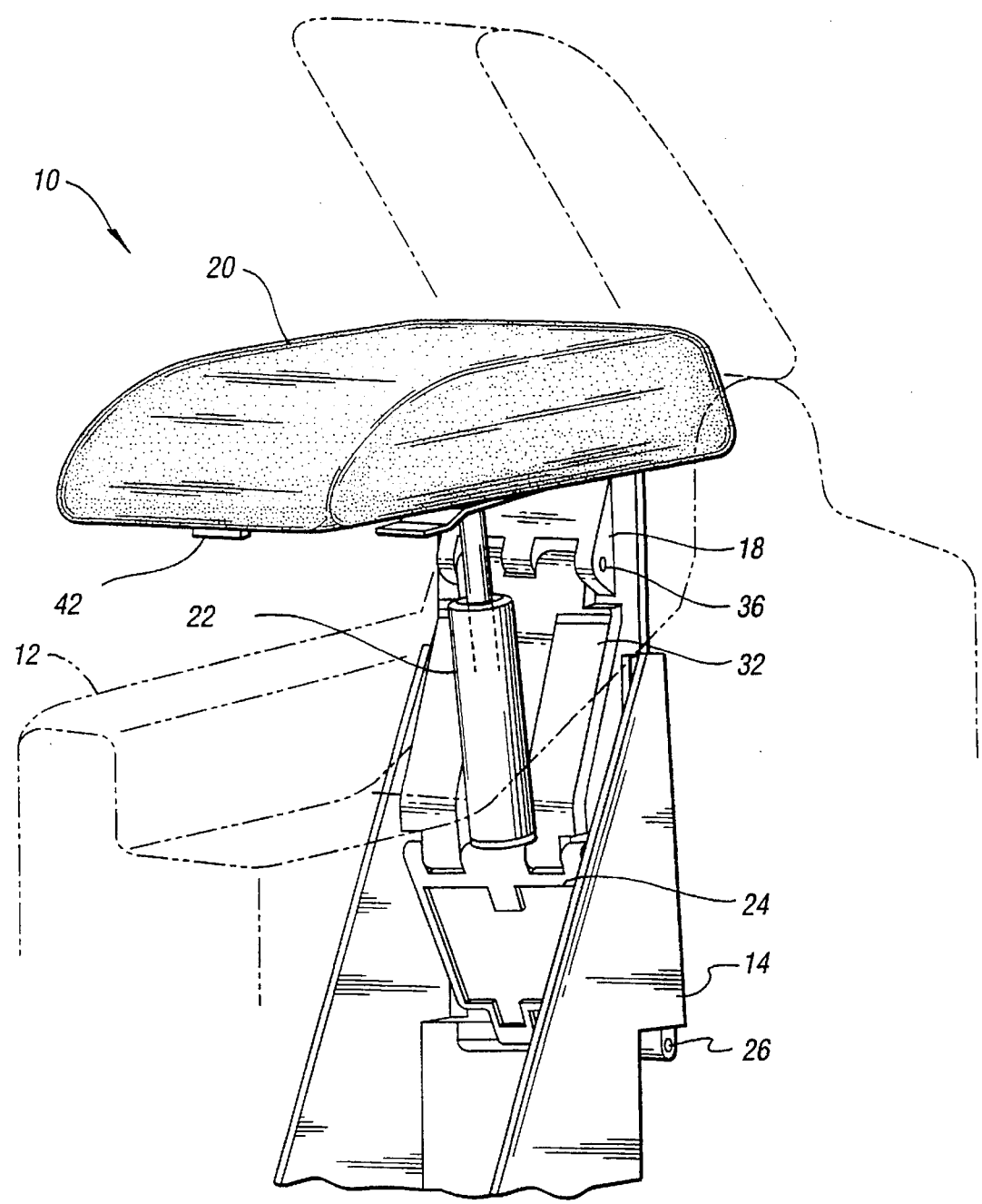
FIG. 1 shows a perspective view of an armrest assembly in accordance with the present invention, with a console and upright armrest shown in phantom.
Figure 2:
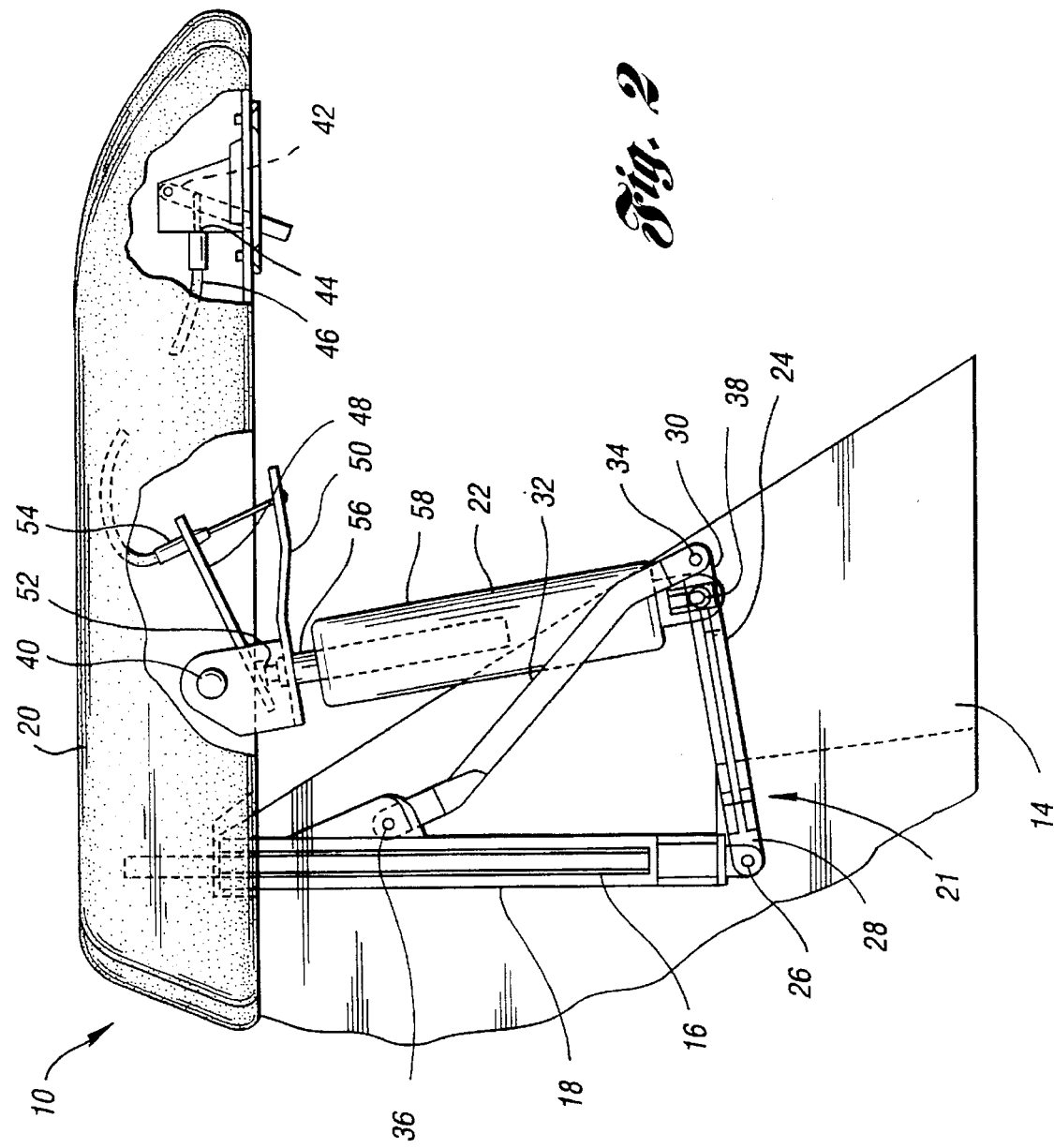
FIG. 2 shows a partially cutaway side view of an armrest assembly in accordance with the present invention.
Figure 3:
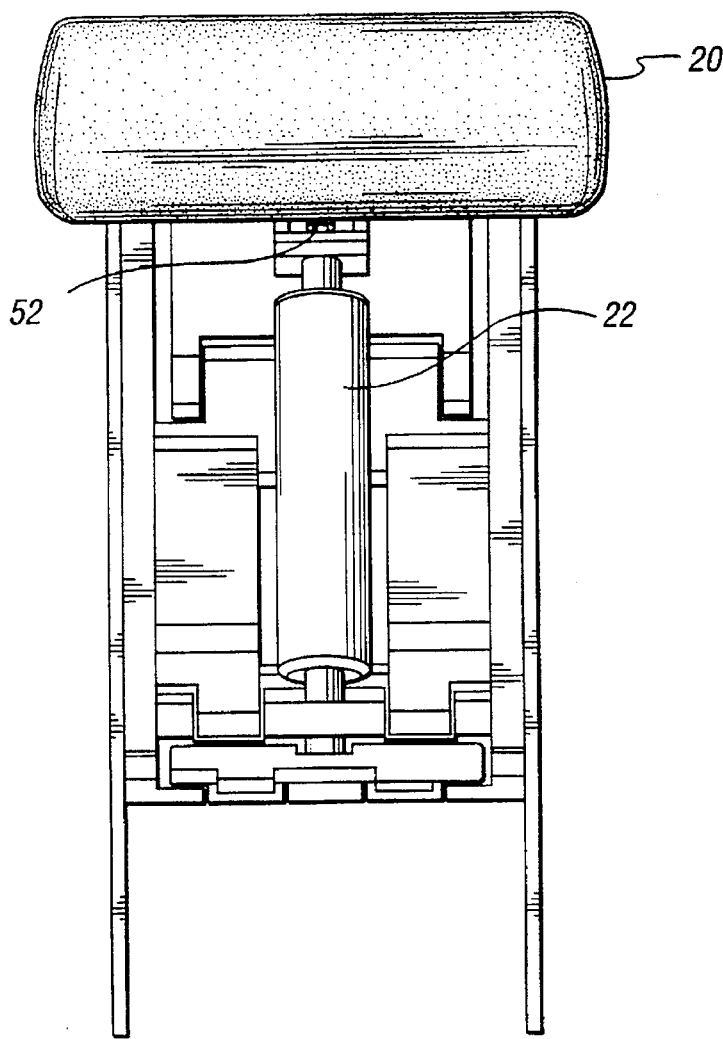
FIG. 3 shows a frontal view of an armrest assembly in accordance with the present invention.

Referring to FIGS. 1 and 2, an armrest assembly 10 is shown in accordance with the present invention. The armrest assembly 10 is shown located within a console 12 (shown in phantom in FIG. 1). The armrest assembly 10 includes a base 14 which is rigidly supported within a vehicle console. A guide member 16 is rigidly mounted to the base. A translational member 18 is slidably mounted about the guide member 16. An armrest 20 is mounted to the translational member 18 for movement therewith.

The armrest 20 is supported with respect to the kinematic structure 21 by a self-locking air spring 22. This configuration is shown in a side view in FIG. 2. A first support member 24 is pivotally mounted to the guide member 16 about the support pin 26 at the first end 28 of the first support member 24. The support pin 26 is supported by the base 14. The second end 30 of the first support member 24 is pivotally connected with respect to a second support member 32 about a second support pin 34. The second support member 32 is pivotally connected with respect to the translational member 18 at the third support pin 36.

The air spring 22 is pivotally connected to the first support member 24 at the pivot joint 38. The pivot joint 38 is optimally positioned intermediate the first and second ends of the first support member 24 to provide a moment arm between support pin 26 and pivot joint 38. This moment arm provides a mechanical advantage to a user when pushing down upon the armrest 20. This moment arm can reduce the force required to compress the air spring by 50% or more, thereby providing the air spring in a usable range of operation for vehicle occupants.

The air spring 22 is pivotally connected with respect to the armrest 20 at the pivot pin 40.

The armrest 20 may be lowered or raised by a vehicle occupant by manipulation of the control button or lever 42. The control button 42 is operatively connected to a cable 44, which is supported within a sheath 46. As the control button 42 is moved, the cable 44 travels with respect to the sheath 46. Air spring pinch plates 48, 50 are provided to depress the air spring control pin 52. The pivotable pinch plate 48 is pivotally movable with respect to the rigid pinch plate 50. The sheath support 54 acts a thrust support member so that the pivotable pinch plate 48 may be moved with respect to the rigid pinch plate 50 as the cable 44 moves with respect to the sheath 46 when the control button 42 is manipulated.

The air spring 22 is in a normally locked position when the air spring control pin 52 is extended. When the air spring control pin 52 is depressed by the pinch plates 48,50, the air spring is released and the internal configuration of the air spring provides an extension force to the air spring piston 56 with respect to the air spring housing 58. Therefore, if a vehicle occupant wishes to raise the armrest 20, the control button 42 is depressed, which moves the air spring control pin 52 inward, thereby resulting in an extension force upon the air spring piston 56, which tends to force the armrest 20 upward. Normally this upward force would be a problem for a vehicle occupant when the occupant desires to lower the armrest. However, the kinematic structure of the first and second support members 24,32 in combination with the air spring provide a moment arm between support pin 26 and pivot joint 38, which creates a mechanical advantage for the operator when pressing down upon the armrest 20. This kinematic structure allows the vehicle occupant to depress the air spring piston 56 against substantial extension forces.

Figure 4:
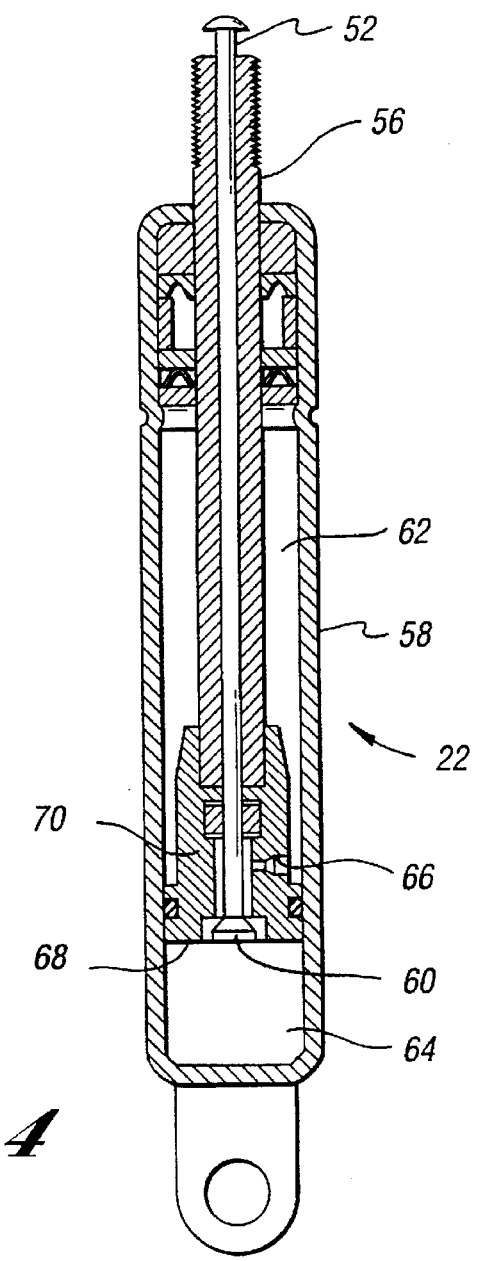
FIG. 4 shows a vertical cross-section through an air spring for use in accordance with the present invention.

The air spring 22 is shown in greater detail in FIG. 4. The air spring 22 includes a housing 58 with a piston 56 movably mounted with respect thereto. An air spring control pin 52 extends the length of the piston 56 and is operatively connected to the valve 60. The air spring chambers 62,64 are filled with pressurized fluid. The pressurized fluid in chamber 62 is under substantially higher pressure than that of chamber 64. Accordingly, when the valve 60 is opened, pressurized fluid from the upper chamber 62 tends to move into the lower chamber 64 through the orifice 66. This movement of pressurized fluid into the lower chamber 64 causes an increasing force to act against the lower surface 68 of the chamber separation unit 70 as a result of the pressurized fluid acting against the lower surface 68. Accordingly, the pressurized fluid in the lower chamber 64 forces the chamber separation unit 70 and the piston 56 upward, thereby providing a force to raise the armrest 20.

When the vehicle occupant wishes to lower the armrest, the air spring control pin 52 is depressed, thereby allowing the operator to push the armrest 20 and piston 56 downward with the assistance of the kinematic structure 21. Since the valve 60 is open, pressurized fluid from the lower chamber 64 is allowed to travel through the orifice 66 into the upper chamber 62. This allows the piston 56 and chamber separation unit 70 to move down with respect to the housing 58. When the air spring control pin 52 is released, the valve 60 closes and an effective force balance is created by the upper and lower chamber 62,64, thereby locking the piston into position with respect to the housing 58. A more detailed description of a similar air spring for use with the present invention is provided in U.S. Pat. No. 3,762,514, herein incorporated by reference in its entirety.

As shown in phantom in FIG. 1, the armrest 20 may be pivotally connected with respect to the translational member 18, thereby allowing the console 20 to be pivoted upward to an inoperable position in order to allow axis to storage areas below the armrest 20.

Figure 5:
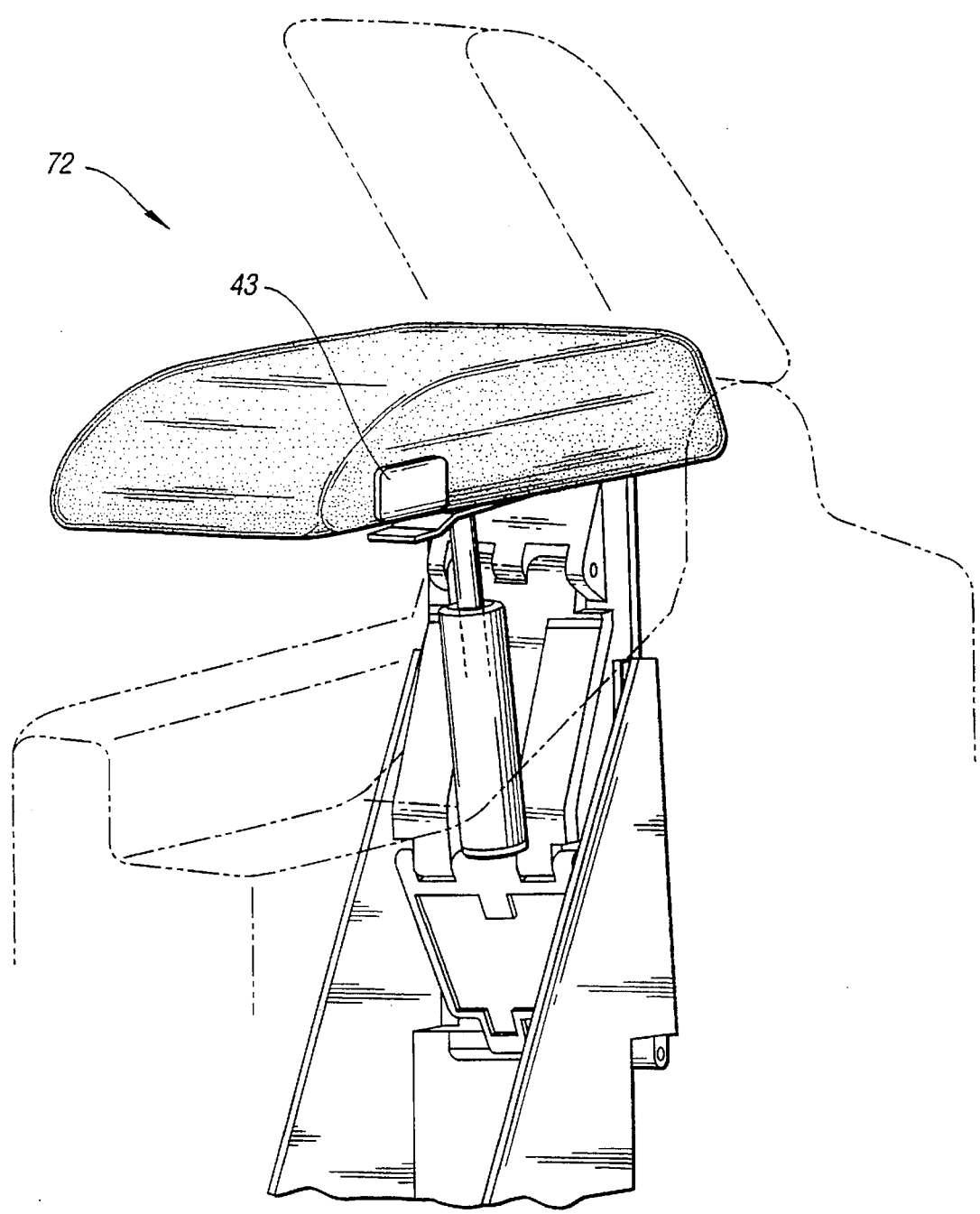
FIG. 5 shows a perspective view of an alternative armrest assembly in accordance with the present invention.

The embodiment shown for the control button 42 is merely an example of a means for actuating the air spring 22. FIG. 5 shows an alternative embodiment 72 of the console assembly in accordance with the present invention, including alternative control button 43 for actuating the cable 44. In this alternative embodiment, the button 43 is located for manipulation by the driver's thumb. The present invention contemplates that various alternative designs could be implemented for configuration and location of this control button. It could be a button or a lever, and it could be positioned at any convenient location on the armrest.

The kinematic structure provided for the air spring 22 for use in the armrest assembly 10 is applicable to many other applications, especially in vehicles. For example, this kinematic structure may be used in supporting a vehicle seat, steering wheel, etc. In the prior art, air springs were deemed to be effectively impractical due to the large forces involved, however, this kinematic structure design provides a vast array of possibilities for these self-actuating mechanisms. These various uses for this kinematic structure in combination with the air spring are contemplated under the present invention as claimed.

While the best mode for carrying out the invention has been described in detail, those familiar with the art to which this invention relates will recognize various alternative designs and embodiments for practicing the invention. Thus, the above described preferred embodiment is intended only to be illustrative of the invention, which may be modified within the scope of the following appended claims.

What is claimed is:

1. An armrest assembly for a vehicle, comprising:
  a base adapted for mounting in the vehicle;
  a translational member slidably mounted for vertical movement with respect to said base;
  a movable armrest coupled to said translational member for movement therewith;
  a loadable actuator having first and second ends, said first end of said actuator being operatively coupled to said armrest for moving said armrest when loaded;

a first support member positioned beneath the movable armrest and having first and second ends, said first end of said first support member being pivotally coupled to said base;

a second support member positioned beneath the movable armrest and having first and second ends, said first end of said second support member being pivotally coupled to said second end of said first support member, and said second end of said second support member being pivotally coupled with respect to said translational member; and said second end of said loadable actuator being pivotally coupled to said first support member intermediate said first and second ends of said first support member whereby to provide a moment arm to facilitate loading of said actuator as said armrest is lowered.

2. The armrest assembly of claim 1, wherein said loadable actuator comprises an air spring.

3. The armrest assembly of claim 1, further comprising a latching mechanism operatively connected to said loadable actuator, whereby to selectively secure said actuator in desired loaded positions.

4. The armrest assembly of claim 3, further comprising a control mechanism operatively connected to said latching mechanism to selectively latch and unlatch said latching mechanism, whereby to selectively secure said armrest in desired vertical positions.

5. The armrest assembly of claim 4, wherein said control mechanism comprises:

a control lever;

a cable operatively connected between said control lever and said latching mechanism; and a sheath slidably encasing said cable.

6. The armrest assembly of claim 1, wherein said actuator is self-locking.

7. The armrest assembly of claim 1, wherein said armrest is pivotable between a horizontal operative position and a vertical inoperative position.

8. An armrest assembly for a vehicle, comprising:

a base;

an armrest slidably connected with respect to said base;

a loadable actuator positioned beneath the armrest and having first and second ends, said first end of said actuator being operatively coupled to said armrest for moving said armrest when loaded;

a moment arm member pivotally connected to said base beneath said armrest and operatively coupled to said second end of said loadable actuator to provide mechanical advantage to facilitate downward movement of said armrest against resistance of said loadable actuator.

9. The armrest assembly of claim 8, wherein said loadable actuator comprises an air spring.

10. The armrest assembly of claim 8, further comprising a latching mechanism operatively connected to said loadable actuator, whereby to selectively secure said actuator in desired loaded positions.

11. The armrest assembly of claim 10, further comprising a control mechanism operatively connected to said latching mechanism to selectively latch and unlatch said latching mechanism, whereby to selectively secure said armrest in desired vertical positions.

12. The armrest assembly of claim 11, wherein said control mechanism comprises:

a control lever;

a cable operatively connected between said control lever and said latching mechanism; and a sheath slidably encasing said cable.

13. The armrest assembly of claim 8, wherein said actuator is self-locking.

14. The armrest assembly of claim 8, wherein said armrest is pivotable between a horizontal operative position and a vertical inoperative position.

15. A kinematic structure for an air spring assembly, comprising:

a base;

a translational member slidably mounted with respect to said base;

a movable member coupled to said translational member for movement therewith;

a loadable air spring having first and second ends, said first end of said air spring being operatively coupled to said movable member for movement therewith;

a first support member having first and second ends, said first end of said first support member being pivotally coupled with respect to said base;

a second support member having first and second ends, said first end of said second support member being pivotally coupled to said second end of said first support member, and said second end of said second support member being pivotally coupled with respect to said translational member; and said second end of said air spring being pivotally coupled with respect to said first support member intermediate said first and second ends of said first support member whereby to provide a moment arm to facilitate loading of said air spring as said movable member is moved in a direction to load said air spring.

* * * * *